W. L. KEMPER.
TIRE.
APPLICATION FILED JULY 12, 1920.
1,385,252.
Patented July 19, 1921.
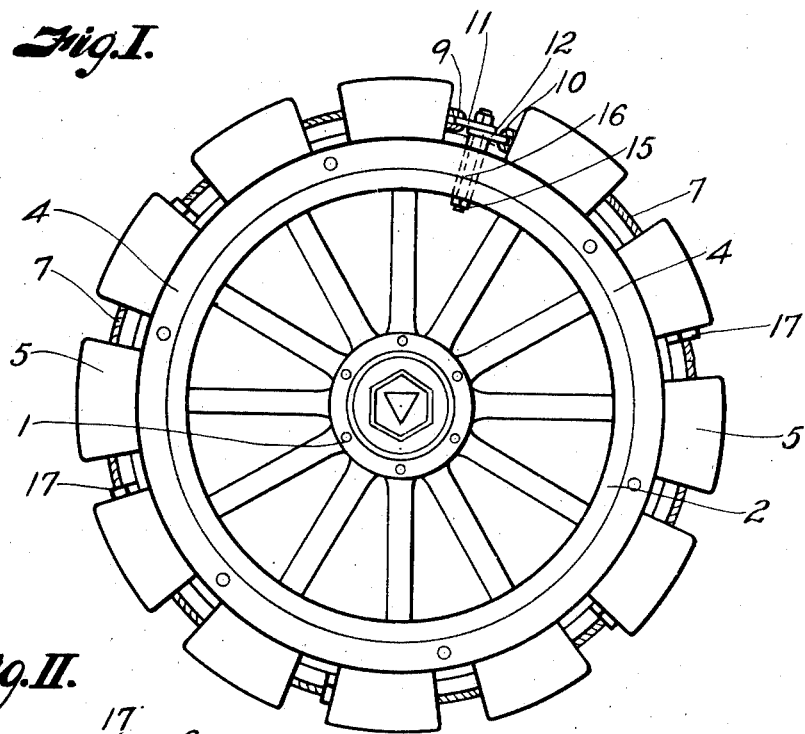
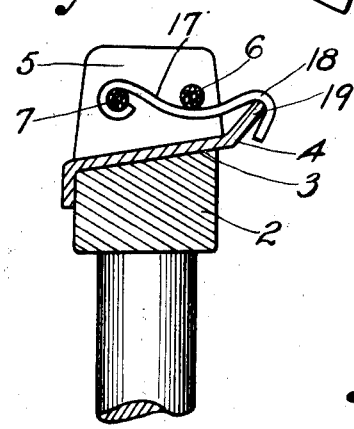
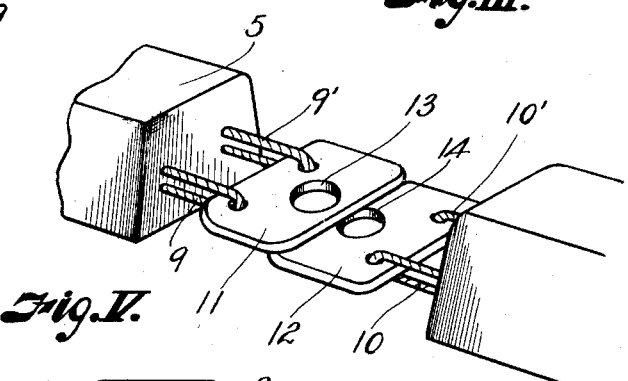
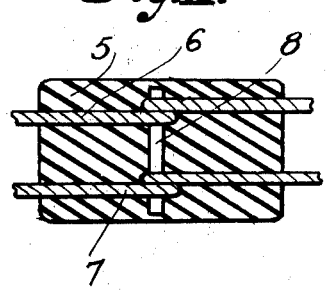
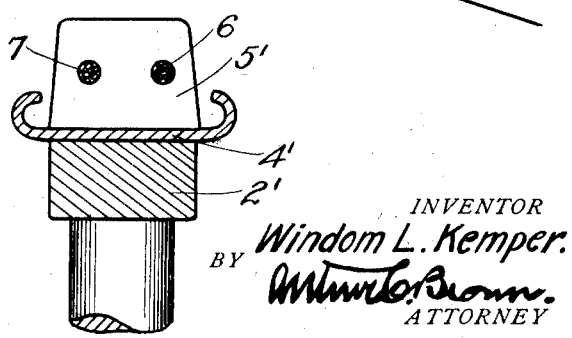
INVENTOR
Windom L. Kemper.
BY
Arthur C. Brown
ATTORNEY

UNITED STATES PATENT OFFICE.

WINDOM L. KEMPER, OF TOPEKA, KANSAS.

TIRE.

1,385,252.   Specification of Letters Patent.   Patented July 19, 1921.

Application filed July 12, 1920. Serial No. 395,617.

*To all whom it may concern:*

Be it known that I, WINDOM L. KEMPER, a citizen of the United States, residing at Topeka, in the county of Shawnee and State of Kansas, have invented certain new and useful Improvements in Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to tires and particularly to a temporary tire which may be attached to a wheel for temporary use.

It not infrequently happens that the tires of motor vehicles become punctured or deflated so that they are unfit for further use without being repaired. If the car is run on the deflated tire, the shoe becomes cut and the entire tire is sometimes rendered unfit for use.

The present invention is to take the place of a spare tire for the purpose of permitting the occupants of the vehicle to continue their journey until they reach a garage or other point at which a properly fitted tire can be procured.

One of the objects of the invention is to provide a tire which may be readily stored and which may be conveniently attached in an emergency.

The invention contemplates the provision of means whereby flexibly secured tire sections may be applied to the rim of a wheel and appropriately secured in place, preferably by a fastening device projecting through the air tube stem hole in the tire felly.

In the drawings,

Figure I is an elevational view of a wheel to which my invention is applied.

Fig. II is a cross sectional view through the rim and tire.

Fig. III is a detail perspective view of the two meeting ends of the tire.

Fig. IV is a sectional view through one of the blocks, and

Fig. V is a cross sectional view through a slightly modified form of rim to which my invention is applied.

1 designates a wheel of appropriate construction provided with a felly 2 having an inclined periphery, as at 3, to receive a rim 4, forming part of a detachable tire clamp. The tire constituting my invention is illustrated as comprising a plurality of spaced rubber blocks 5, through which are projected pairs of flexible connections or cables 6 and 7, the cables being secured to transverse pins 8 embedded in the blocks as shown. Therefore, the blocks are all connected together except the last two blocks, which are provided with loops 9 and 9' and 10 and 10', carrying plates 11 and 12 provided with openings 13 and 14, which are adapted to be brought into alinement to receive a fastening bolt 15, passing through the openings 13 and 14 and into the valve stem opening 16 in the felly 2 and member 4.

The connections 6 and 7 preferably consist of wire cable because a flexible connection is more efficient than a rod and the cable provides the maximum tensile strength for the connections between the blocks.

At suitable points about the tire and located between certain of the blocks are hinged hooks 17, the ends of which are hooked to one of the flexible connections 7 and the body portion of which preferably passes under one of the other connections 6, the hooked, free end 18 being adapted to engage the flange 19 on the rim 4 whereby liability of sidewise thrust displacing the tire in the direction away from the flange 19 will be eliminated. There is no liability of the wheel tire being displaced in the other direction due to side thrusts because a sidewise movement in that direction will be resisted by the angle of the wheel rim and the flange 19.

Therefore, it will be apparent that the tire may be readily applied to a wheel rim upon taking off the regular tire and that it will serve the purpose of a cushion for the wheel until proper repairs could be made.

When not in use the tire can be folded up and stored away in any convenient place in the motor vehicle.

In Fig. 5 I have shown my invention applied to an ordinary clencher rim 4'. The inner surface of the blocks 5' in this case being horizontal to conform to the rim 4', and the blocks are prevented from side displacement by the flanges of the rim 4'.

What I claim and desire to secure by Letters Patent is:

1. A tire comprising a plurality of rubber blocks, flexible connections between the blocks, means for securing the flexible connections to the blocks comprising transverse rods around which the flexible connections engage, and means for securing the tire to the wheel, said means having a portion to engage the tire stem opening in the wheel rim.

2. A tire comprising a split band consisting of a plurality of rubber blocks, cables connecting one block to another, and means for securing the ends of the tire together, said means having a valve stem opening-engaging portion whereby said means may fasten the tire to the wheel to prevent creeping.

3. A tire consisting of a plurality of spaced blocks, means connecting the blocks together, and rim-engaging members carried by the connections, said rim-engaging members comprising hooks to engage the projecting flange of a wheel rim to prevent side thrusts of the tire.

4. A tire comprising a plurality of blocks, cables connecting said blocks, plates carried by certain of the blocks and having alining openings whereby when said openings are brought into alinement the tire can be fastened into ring shape, and a fastening device for engaging said openings to secure the plates together.

In testimony whereof I affix my signature.

WINDOM L. KEMPER.